J. L. ALLEN.
DEVICE FOR SLICING FISH.
APPLICATION FILED MAR. 17, 1916. RENEWED MAR. 17, 1917.
1,223,550.
Patented Apr. 24, 1917.
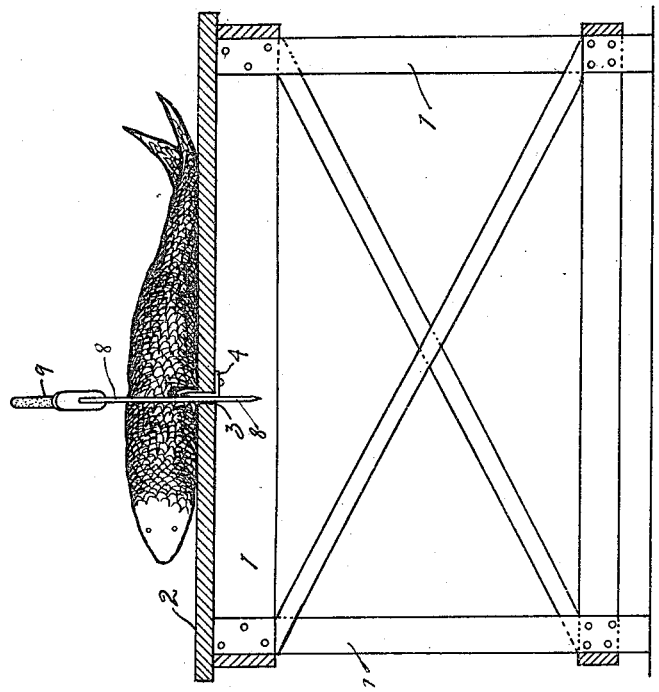
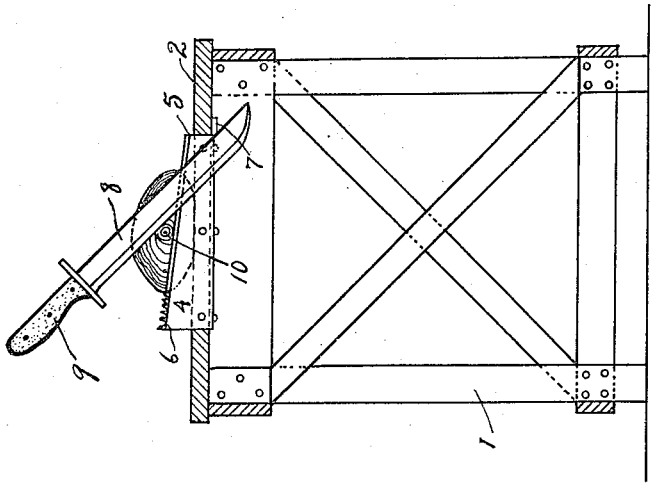
INVENTOR
James Leonard Allen
BY
Hardway Cathey
ATTORNEYS.

UNITED STATES PATENT OFFICE.

JAMES LEONARD ALLEN, OF HOUSTON, TEXAS.

DEVICE FOR SLICING FISH.

1,223,550.   Specification of Letters Patent.   Patented Apr. 24, 1917.

Application filed March 17, 1916, Serial No. 84,759. Renewed March 17, 1917. Serial No. 155,612.

*To all whom it may concern:*

Be it known that I, JAMES LEONARD ALLEN, a citizen of the United States, residing at Houston, in the county of Harris and State of Texas, have invented certain new and useful Improvements in Devices for Slicing Fish, of which the following is a specification.

This invention relates to new and useful improvements in a device for slicing fish and the like.

The object of the invention is to provide a device of the character described by which meat and fish may be sliced in smooth even slices.

A further object of the invention is to so construct the device that the bone contained in the meat or fish may be sliced through smoothly so that the slice however thin may be cut off with a uniform thickness.

With the above and other objects in view the invention has particular relation to certain novel features of construction, use and arrangement of parts, an example of which is given in this specification and illustrated in the accompanying drawings, wherein:

Figure 1 is a sectional end elevation of the device, showing the same in position for use, and Fig. 2 is a sectional side elevation thereof.

Referring now more particularly to the drawings wherein like numerals of reference designate similar parts, in each of the figures the numeral 1 refers to the supporting frame upon which the table 2 is mounted. Through the table 2 and located near the central parts thereof is a slot 3 of suitable length and width. Secured to the under side of the table and upstanding through the slot at one side is a blade 4, which is inclined forwardly from the point 5 to the other end 6 thereof. This blade may, if desired, have a serrated edge, as shown in Fig. 1, to prevent the object sought to be cut from slipping during the slicing operation. In front of, and extending across the slot 3 is a bar of metal 7 forming a fulcrum for the point of the knife 8 when the handle 9 is forced downwardly during the slicing operation.

In slicing fish or flesh containing bone, the carving knife 8 is used to slice down through the same on one side until the bone is reached, whereupon the article to be sliced is turned over with the blade 4 projecting into the incision just made by the carving knife, then the carving knife is inserted through the slot 3 and the top portion of the fish or flesh to be cut is cut down to the bone and then the point of the knife is engaged under the metal bar 7 and by forcing the handle 9 thereof downwardly the bone 10 will be cut in two.

What I claim is:

A device of the character described including a table, a suitable support therefor, said table having a slot therethrough, a blade secured to the table and projecting through the slot and being inclined forwardly, a transverse bar secured underneath the table at one end of the slot and a knife, one end of which is engaged under the bar and which coöperates with said blade.

In testimony whereof I have signed my name to this specification in the presence of two subscribing witnesses.

JAMES LEONARD ALLEN.

Witnesses:
ANNIE L. CARY,
RUBY GLAZNER.

Copies of this patent may be obtained for five cents each, by addressing the "Commissioner of Patents, Washington, D. C."